United States Patent
Gui et al.

(10) Patent No.: US 6,838,189 B1
(45) Date of Patent: Jan. 4, 2005

(54) MAGNETIC RECORDING MEDIA WITH HIGH SNR AND HIGH THERMAL STABILITY

(75) Inventors: Jing Gui, Fremont, CA (US); Gary Clark Rauch, Pleasanton, CA (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 10/394,281

(22) Filed: Mar. 24, 2003

Related U.S. Application Data

(62) Division of application No. 09/840,919, filed on Apr. 25, 2001, now Pat. No. 6,596,341.
(60) Provisional application No. 60/220,658, filed on Jul. 25, 2000.

(51) Int. Cl.[7] .................................................. G11B 5/65
(52) U.S. Cl. ........................ 428/611; 428/636; 428/663; 428/666; 428/667; 428/323; 428/336; 428/409; 428/694 T; 428/694 TP
(58) Field of Search ................................ 428/611, 636, 428/663, 666, 667, 323, 336, 409, 694 TS, 694 TP, 694 T, 212

(56) References Cited

U.S. PATENT DOCUMENTS

| | | | |
|---|---|---|---|
| 6,287,429 B1 | * | 9/2001 | Moroishi et al. ........ 204/192.2 |
| 6,456,448 B1 | | 9/2002 | Akagi et al. |
| 6,555,248 B1 | * | 4/2003 | Takahashi et al. .......... 428/611 |
| 6,623,873 B1 | * | 9/2003 | Matsuda et al. ....... 428/694 TS |
| 2002/0068200 A1 | * | 6/2002 | Inaba et al. ............ 428/694 TS |

FOREIGN PATENT DOCUMENTS

| JP | 56-148732 A | * | 11/1981 |
|---|---|---|---|
| JP | 62-202316 A | * | 9/1987 |

\* cited by examiner

*Primary Examiner*—Kevin M. Bernatz
(74) *Attorney, Agent, or Firm*—McDermott Will & Emery LLP

(57) ABSTRACT

Magnetic recording media exhibiting high SNR and high thermal stability are produced by sputter depositing a magnetic alloy overlying a non-magnetic substrate, e.g., on an underlayer, heating to eliminate thermally unstable small grains thereby increasing the average grain size of the magnetic alloy layer but narrowing the grain size distribution, depositing a layer comprising a non-ferromagnetic element, and then heating to diffuse the non-ferromagnetic element into the grain boundaries of the heat treated magnetic alloy layer. Embodiments include heating to diffuse the non-ferromagnetic element leaving a layer comprising the non-ferromagnetic element, at a thickness up to about 3Å, on the magnetic alloy layer, with the amount of the non-ferromagnetic element diffused into the grain boundaries of the magnetic alloy layer gradually decreasing from the upper surface of the magnetic alloy layer toward the underlayer.

9 Claims, 3 Drawing Sheets

MAGNETIC RECORDING MEDIA WITH HIGH SNR AND HIGH THERMAL STABILITY

RELATED APPLICATION

This application is a divisional of application Ser. No. 09/840,919 filed Apr. 25, 2001, now U.S. Pat. No. 6,596,341, which claims benefit of 60/220,658 filed Jul. 25, 2000.

TECHNICAL FIELD

The present invention relates to the recording, storage and reading of magnetic data, particularly rotatable magnetic recording media, such as thin film magnetic disks. The invention has particular applicability to high areal density magnetic recording media exhibiting high coercivity and thermal stability.

BACKGROUND ART

Thin film magnetic recording disks and disk drives are conventionally employed for storing large amounts of data in magnetizable form. Data are written onto and read from a rapidly rotating recording disk by means of a magnetic head transducer assembly that flies closely over the surface of the disk. The escalating requirements for high linear recording density and increasingly smaller disk drives impose increasingly demanding requirements on thin film magnetic recording media in terms of coercivity, remanence, coercivity squareness, low medium noise and narrow track recording performance. Considerable effort has been expended in recent years to produce magnetic recording media having high linear recording densities while satisfying such demanding requirements, particularly for longitudinal recording. However, it is extremely difficult to produce a magnetic recording medium satisfying such demanding requirements, particularly a high density magnetic rigid disk medium.

In order to realize ultra-high linear recording density, magnetic recording media with high coercivity and small Mrt (magnetic remanence×film thickness) are needed. However, this objective can only be accomplished by decreasing the medium noise, as by maintaining very fine magnetically noncoupled grains. Medium noise typically measured as the signal to noise ratio (SNR), is a dominant factor restricting increased recording density of high density magnetic hard disk drives. Medium noise in thin films is attributed primarily to inhomogeneous grain size and intergranular exchange coupling. Therefore, in order to increase linear density, medium noise must be minimized by suitable microstructure control.

A conventional longitudinal recording disk medium is depicted in FIG. 1 and typically comprises a non-magnetic substrate 10 having sequentially deposited thereon an underlayer 11, such as chromium (Cr) or a Cr-alloy, a magnetic layer 12, typically comprising a cobalt (Co) alloy, a protective overcoat 13, typically containing carbon, and a lubricant topcoat 14. Underlayer 11, magnetic layer 12 and protective overcoat 13 are typically deposited by sputtering techniques. The Co alloy magnetic layer normally comprises polycrystallities epitaxially grown on the polycrystal Cr or Cr-alloy underlayer. Conventional magnetic recording media comprise a cobalt (Co)based magnetic alloy layer, such as polycrystalline cobalt-chromium-tantalum (CoCrTa), cobalt-chromium-platinum (CoCrPt), cobalt-chromium-tantalum-platinum (CoCrTaPt) and cobalt-chromium-platinum-boron (CoCrPtB). The underlayer 11 schematically illustrated in FIG. 1 can comprise a plurality of seedlayers and/or underlayers. Although layers 11 through 14 are shown formed on top of substrate 10, it should be recognized that such layers 11 through 14 are conventionally formed sequentially on both sides of substrate 10.

Major sources of recording noise from magnetic thin film media can be attributed to the zigzag transition boundary due to finite grain size, resulting from bits polarized in opposite directions, and intergranular magnetic coupling. Prior attempts to suppress such noise sources have focused on reducing grain size and isolating grains. Grain size reduction can effectively reduce the magnetic transition width, and thereby reduce noise. However, the reduction in noise benefits to be achieved by grain size reduction is limited by the superparamagnetic limit commonly referred to as the thermal stability limit. Basically, when a grain within a magnetic thin film becomes too small, it begins to loose its ability to resist thermal perturbation and maintain the orientation of its magnetization. Once a ferromagnetic material becomes thermally unstable, it can no longer be employed as a medium for permanent data storage. At any given temperature, the exact grain size at which a ferromagnetic material becomes thermally unstable is to a large extent dependent upon the particular material. For example, typical cobalt (Co)based alloys can remain thermally stable at normal disk drive operating temperatures, i.e., about 75° C., if the grain diameter is not significantly lower than about 7 to about 8 nm.

However, not all grains within a magnetic thin film exhibit the same grain size. In fact, the grain size distribution typically follows a log-normal distribution, as shown in FIG. 2. Accordingly, a reduction in grain size typically means a reduction in the average grain size, i.e., a downward shift of the entire grain size distribution. For a given distribution, there are inevitably some grains that are too small to remain thermally stable at the disk drive operating temperature. These small grains are often referred to as "thermal idiots". As the overall grain size distribution of a magnetic film shifts downwardly, there will be more and more thermal idiots in the film. When a significant portion of grains become thermal idiots, the film is, manifestly, no longer capable of storing data permanently.

As a result of magnetic coupling between grains, a magnetic switching unit in a thin film media may typically consist of a cluster of grains, which could lead to broad transition even if each individual grain is small. To isolate grains, non-ferromagnetic elements such as chromium (Cr), manganese (Mn) and tantalum (Ta), are usually introduced to the Co-based magnetic alloys. Such non-ferromagnetic elements tend to segregate at the grain boundaries by diffusion. As a result of such segregation, the magnetic interactions among neighboring grains are impaired. In order to increase the effectiveness of grain boundary segregation, the concentration of the non-ferromagnetic elements in the alloy must be sufficiently high to ensure an adequate driving force for diffusion. However, the addition of such non-ferromagnetic elements produces undesirable side effects, such as diluting the magnetic moment within the grain since not all of the non-ferromagnetic atoms diffuse to the grain boundaries. Consequently, the magnetic signal is reduced. Such non-ferromagnetic elements also lower the magnetic anisotropy of the material, leading to lower coercivity and reduced thermal stability. There is, therefore, a fundamental conflict between producing a magnetic recording medium exhibiting lower noise and producing a magnetic recording media exhibiting high thermal stability.

Accordingly, a need exists for a magnetic recording media exhibiting high thermal stability and low media noise and for enabling methodology. There exists a particular need for such media capable of high areal recording density exhibiting high coercivity.

DISCLOSURE OF THE INVENTION

An aspect of the present invention is a magnetic recording medium exhibiting a high SNR and high thermal stability.

Another aspect of the present invention is a method of manufacturing a magnetic recording medium exhibiting a high SNR and high thermal stability.

Additional aspects and other features of the present invention will be set forth in part in the description which follows and in part will become apparent to those having ordinary skill in the art upon examination of the following or may be learned from the practice of the present invention. The aspects of the present invention may be realized and obtained as particularly pointed out in the appended claims.

According to the present invention, the foregoing and other aspects are achieved in part by a method of manufacturing a magnetic recording medium, the method comprising sequentially; depositing a magnetic alloy layer over a non-magnetic substrate, the magnetic alloy layer having an upper surface, a lower surface and comprising grains separated by grain boundaries; heating to increase the average grain size of the magnetic alloy layer; depositing a layer, comprising a non-ferromagnetic element, on the upper surface of the magnetic alloy layer; and heating to diffuse the non-ferromagnetic element into the grain boundaries of the magnetic alloy layer.

Embodiments of the present invention comprise depositing a magnetic alloy layer comprising Co and platinum (Pt), containing no more than 20 at. % of non-ferromagnetic elements, depositing a thin layer comprising a non-ferromagnetic element, e.g., Cr, Mn or Ta, at a thickness up to about 25Å, e.g., at a thickness up to about 10Å. Embodiments of the present invention also comprise heating to increase the average grain size of the magnetic alloy layer at a temperature of about 150° C. to about 600° C., and subsequently heating at a temperature of about 150° C. to about 600° C. to diffuse the non-ferromagnetic element into the grain boundaries. Embodiments of the present invention further comprise heating to diffuse the non-ferromagnetic element leaving a layer of the non-ferromagnetic element, as at a thickness up to about 3Å, on the upper surface of the magnetic layer.

Another aspect of the present invention is a magnetic recording medium comprising: a non-magnetic substrate; and a magnetic alloy layer overlying the substrate, the magnetic alloy layer having an upper surface, a lower surface and grains separated by grain boundaries, the magnetic alloy layer comprising a non-ferromagnetic element diffused into the grain boundaries in an amount gradually decreasing from the upper surface to the lower surface. Embodiments of the present invention further include a magnetic recording medium comprising a layer of the non-ferromagnetic element, at a thickness up to about 3Å, on the upper surface of a magnetic alloy layer.

Additional aspects of the present invention will become apparent to those skilled in the art from the following detailed description, wherein embodiments of the present invention are described, simply by way of illustration of the best mode contemplated for carrying out the invention. As will be realized, the present invention is capable of other and different embodiments, and its several details are capable of modifications in various obvious respects, all without departing from the present invention. Accordingly, the drawings and description are to be regarded as illustrative in nature, and not as restrictive.

DESCRIPTION OF THE INVENTION

Figure 1:
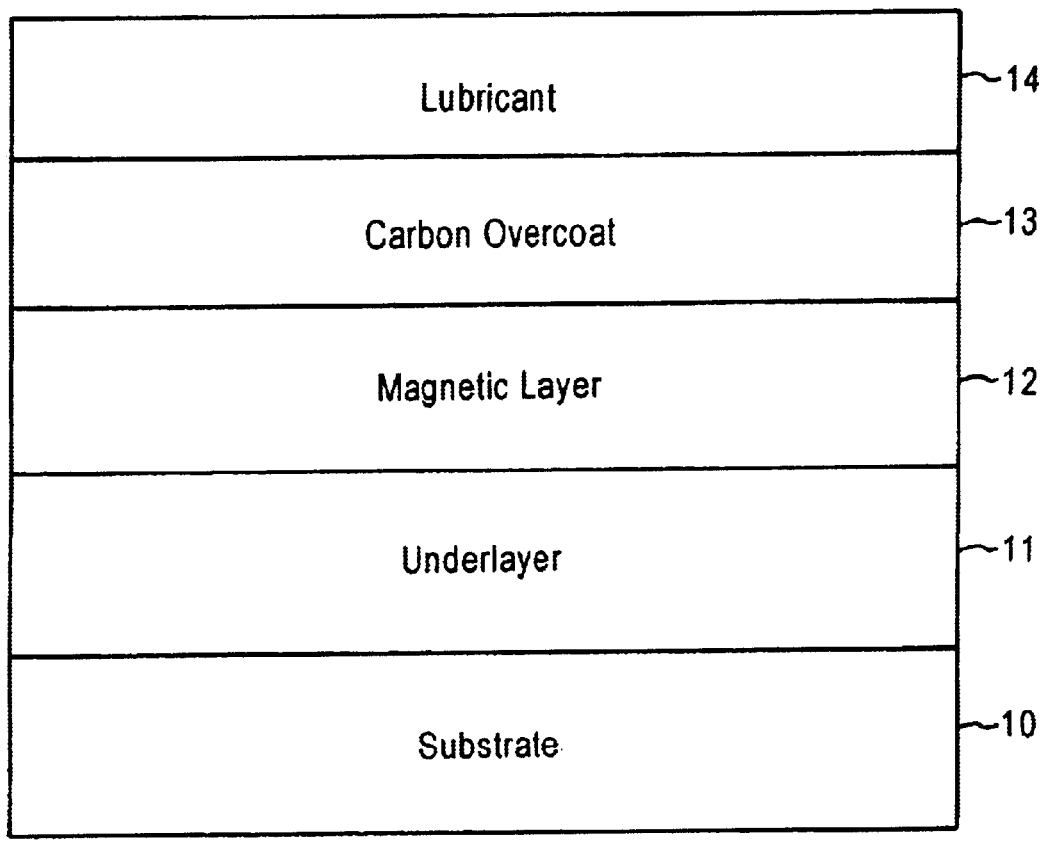
FIG. 1 schematically depicts a conventional magnetic recording medium.

The present invention addresses and solves the competing factors or compromise which must be drawn, between manufacturing a magnetic recording medium exhibiting low noise and, at the same time, high thermal stability. This problem is addressed by reducing the grain size and eliminating thermal idiots while increasing the segregation of non-ferromagnetic elements, such as Cr, Mn and Ta, at the grain boundaries.

Simple post-sputter thermal annealing to remove thermal idiots did not prove particularly successful. Since grain boundaries are not energetically favorable, large grains can grow at elevated temperatures at the expense of small grains. If very small grains (thermal idiots) can be eliminated through thermal annealing, it would have been expected that the thermal stability of the media would improve. On the other hand, the grain-size related media noise would not be expected to have any significant change because the size of the large grains would riot be expected to grow to any significant extent. Assuming that a small grain that disappears during thermal annealing has a radius "r", and a large grain a radius "R" expands $\delta R$, the following relationship exists: $\delta R \sim 0.5 r(r/R)$. As long as both r and (r/R) are small, the growth of the large grain is limited. However, thermal annealing proved unsuccessful in producing low-noise and high thermal stability media because the grain boundary isolation elements, such as Cr, Mn and Ta, tend to segregate in the grain boundaries causing a significant activation barrier for the annealing process. Thus, the segregation of the non-ferromagnetic elements in the grain boundaries stabilizes the grain boundaries and severely impedes the movement of the grain boundaries.

In accordance with the present invention, magnetic recording media are produced having both low media noise and high thermal stability by addressing the interference or the stabilization of the grain boundaries by non-ferromagnetic elements in preventing the elimination of thermal idiots. In accordance with embodiments of the present invention, the grain boundary isolation elements are added to the magnetic alloy layer subsequent to thermal annealing for eliminating thermal idiots, i.e., grains that are expected to exhibit thermal instability at disk drive operating temperatures.

In accordance with embodiments of the present invention, a magnetic alloy layer is deposited overlying a conventional substructure comprising a substrate and one or more seedlayers/underlayers thereon. The magnetic alloy layer should not contain a significant amount of a non-ferromagnetic element, e.g., less than about 20 at. % of the non-ferromagnetic element, such as Cr, Mn or Ta. Suitable magnetic alloy layers include various Co-based alloy layers, such as Co-Pt. Heating is then conducted to reduce the amount of thermal idiots, thereby, lowering or tightening the grain size distribution, i.e., achieving a more uniform grain size distribution. A layer comprising a non-ferromagnetic element, such as a layer containing the element itself or an alloy containing the element, e.g., Cr, Mn or Ta. Heating is then conducted to diffuse the non-ferromagnetic element into the grain boundaries of the magnetic alloy layer. As a result of diffusion, the amount of the ferromagnetic element in the grain boundaries of the underlying magnetic layer gradually decreases from the upper surface to the lower surface, with about 80% of the non-ferromagnetic element in the magnetic alloy layer situated in the grain boundaries. Embodiments of the present invention further include heating to diffuse the ferromagnetic element into the magnetic alloy layer leaving a thin film of the ferromagnetic element on the upper surface of the magnetic alloy layer, e.g., at a film thickness up to about 3Å.

Figure 2:
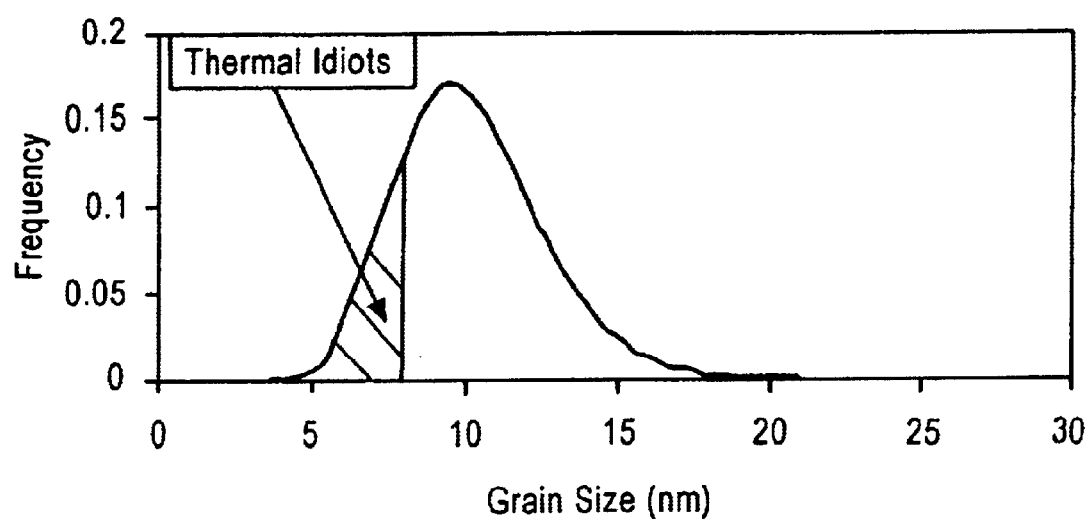
FIG. 2 graphically illustrates a log-normal distribution of grain size distribution for grain in a typical magnetic thin film.

A method in accordance with an embodiment of the present invention is schematically illustrated in FIGS. 3A through 3E, wherein similar features or elements are denoted by similar reference numerals. Adverting to FIG. 3A, a magnetic alloy layer 31, such as Co—Pt without significant amounts of a non-ferromagnetic element, is deposited on a conventional understructure 30 comprising a substrate, seedlayer(s) and underlayer(s). Magnetic alloy layer 31 typically comprises a grain size distribution as shown in FIG. 2, inclusive of grains 32, typically having a grain size less than about 10 nm and relatively smaller grains 33, typically having a grain size less than about 7 nm. The grain size distribution is such that about 80% of the grains have a grain size less than 10 nm (32) and in excess of 50% of the grains have a grain size less than about 7 nm (33) inclusive of thermal idiots.

Annealing is then conducted to narrow the grain size distribution by reducing the number of grains having a grain size less than 7 nm to less than about 30%, during which process small grains are eliminated and the grain size distribution narrowed without any increase in volume. Typically, the average grain size (32A) ranges from 8 to about 10 nm. Such heating can be conducted at a temperature of about 150° C. to about 600° C., for about 10 seconds to about 10 hours, e.g., about 300° C. to about 500° C. for about 0.5 minutes to about 30 minutes.

Figure 3A:
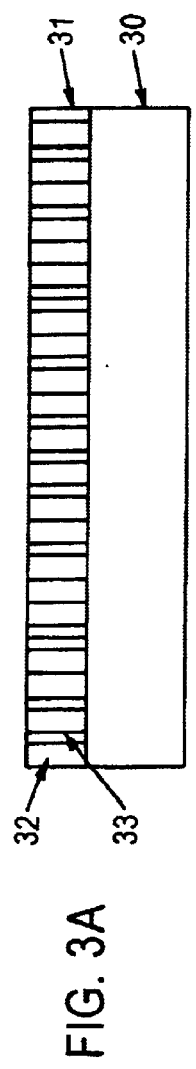
FIGS. 3A through 3E illustrate sequential phases of a method in accordance with an embodiment of the present invention.
Figure 3B:
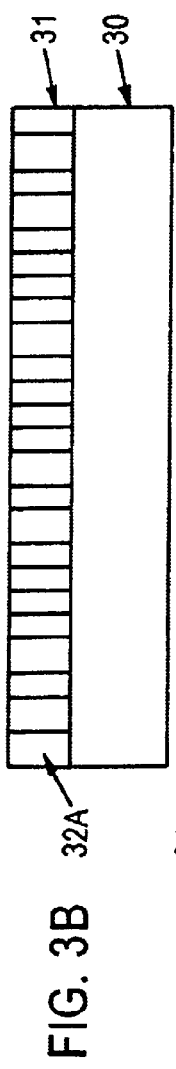
Figure 3C:
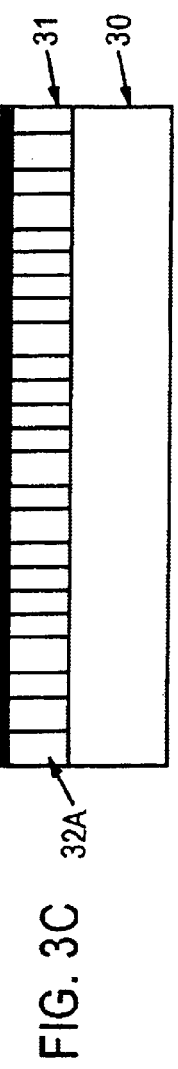

Subsequently, as illustrated in FIG. 3C, a thin layer 34 comprising a non-ferromagnetic element, such as Cr, Mn or Ta, e.g., in elemental or alloy form, is deposited at a thickness depending upon the ultimate concentration desired in the magnetic alloy layer, e.g., about 15 to about 25 at. %. The non-ferromagnetic layer can, therefore, typically be deposited at a thickness up to about 25Å, e.g., about 10Å.

Figure 3D:
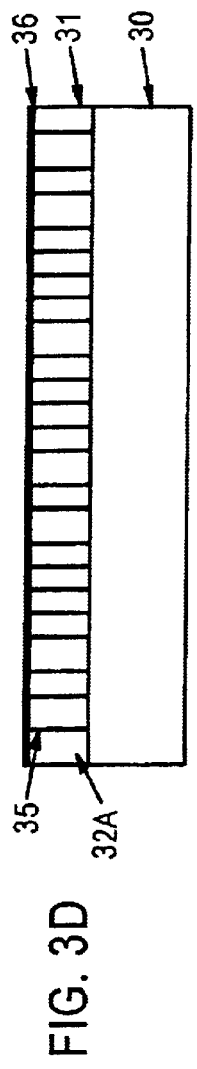
Figure 3E:
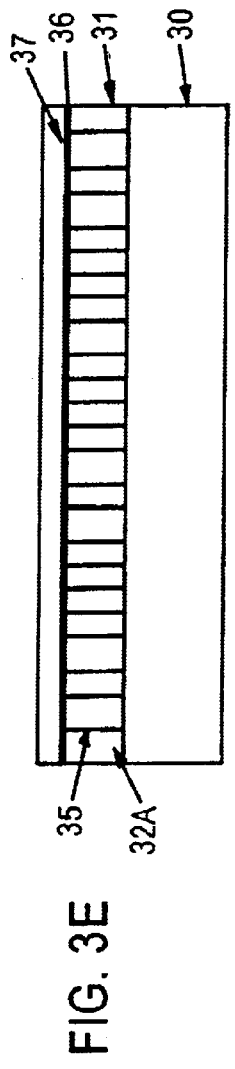

A second thermal annealing step is then conducted, as illustrated in FIG. 3D, to diffuse the non-ferromagnetic element, e.g., Cr, Mn or Ta, into the grain boundaries of magnetic alloy layer 31. As a result of diffusion, the concentration of the non-ferromagnetic element gradually decreases from the upper surface to the lower surface of the magnetic alloy layer 31 as illustrated by reference numeral 35. The amount of the non-ferromagnetic element in magnetic alloy layer 31 is concentrated at the grain boundaries, i.e., typically about 80% or more of the non-ferromagnetic element is concentrated at the grain boundaries. Embodiments of the present invention include heating to diffuse the non-ferromagnetic element into the magnetic alloy layer 31 leaving a thin film of the non-ferromagnetic element 36, such as up to about 3Å, e.g., about 0.5Å to about 3Å, on the upper surface of the magnetic alloy layer. Subsequently, a protective overcoat 37, such as a carbon-containing overcoat is deposited.

The present invention enables the manufacture of magnetic thin film media exhibiting a unique structure to ensure high thermal stability, low noise and high remanent magnetization. High thermal stability is achieved by eliminating very small grains (thermal idiots). Low noise is achieved because the grains are small and isolated due to the grain boundary segregation of the non-ferromagnetic elements, such as Cr, Mn or Ta. High magnetization is achieved by virtue of significantly reducing moment dilution by non-ferromagnetic elements within the grains. Such superior recording properties and structure are achieved by forming the magnetic thin films with a grain size distribution of higher uniformity and well-isolated grain boundaries, and low concentrations of non-ferromagnetic elements within the grains.

The present invention enjoys industrial applicability in a variety of storage media applications. The present invention enjoys particular industrial applicability in manufacturing magnetic recording media for high areal recording density exhibiting high coercivity, low media noise, high magnetization, and high thermal stability.

Only certain embodiments of the present invention and but a few examples of its versatility are shown and described in the present disclosure. It is to be understood that this invention is capable of use in various other combinations and environments and is capable of changes or modification within the scope of the inventive concept as expressed herein.

What is claimed is:

1. A magnetic recording medium comprising:

a non-magnetic substrate;

a magnetic alloy layer overlying the substrate, the magnetic alloy layer having an upper surface, a lower surface and grains separated by grain boundaries, the magnetic alloy layer comprising a non-ferromagnetic element diffused into the grain boundaries in an amount gradually decreasing from the upper surface toward the lower surface; and a layer containing the non-ferromagnetic element, having a thickness up to about 3Å, on the upper surface of the magnetic alloy layer.

2. The magnetic recording medium according to claim 1, wherein the non-ferromagnetic element is at least one element selected from the group consisting of chromium (Cr), manganese (Mn) and tantalum (Ta).

3. The magnetic recording medium according to claim 1, wherein the magnetic alloy layer comprises cobalt and platinum.

4. The magnetic recording medium according to claim 1, wherein the magnetic alloy layer has an average grain size of about 8 to about 10 nm.

5. A magnetic recording medium comprising:

a non-magnetic substrate;

a magnetic alloy layer overlying the substrate, the magnetic alloy layer having an upper surface, a lower surface and grains separated by grain boundaries, the magnetic alloy layer comprising a non-ferromagnetic element diffused into the grain boundaries in an amount gradually decreasing from the upper surface toward the lower surface; and a layer containing the non-ferromagnetic element on the upper surface of the magnetic alloy layer, wherein the non-ferromagnetic element is at least one element selected from the group consisting of manganese (Mn) and tantalum (Ta).

6. The magnetic recording medium according to claim 1, wherein the layer comprising the non-ferromagnetic element has a thickness of about 0.5 to about 3Å.

7. The magnetic recording medium according to claim 1, wherein the magnetic alloy layer comprises up to about 25 at. % of the non-ferromagnetic element.

8. The magnetic recording medium according to claim 7, wherein at least about 80% of the non-ferromagnetic element in the magnetic alloy layer is within the grain boundaries of the magnetic alloy layer.

9. The magnetic recording medium according to claim 1, further comprising a protective overcoat over the magnetic alloy layer.

* * * * *